P. PONS & C. ARCHAMBAULT.
PERCOLATOR.
APPLICATION FILED AUG. 1, 1913.
1,115,451.
Patented Oct. 27, 1914.
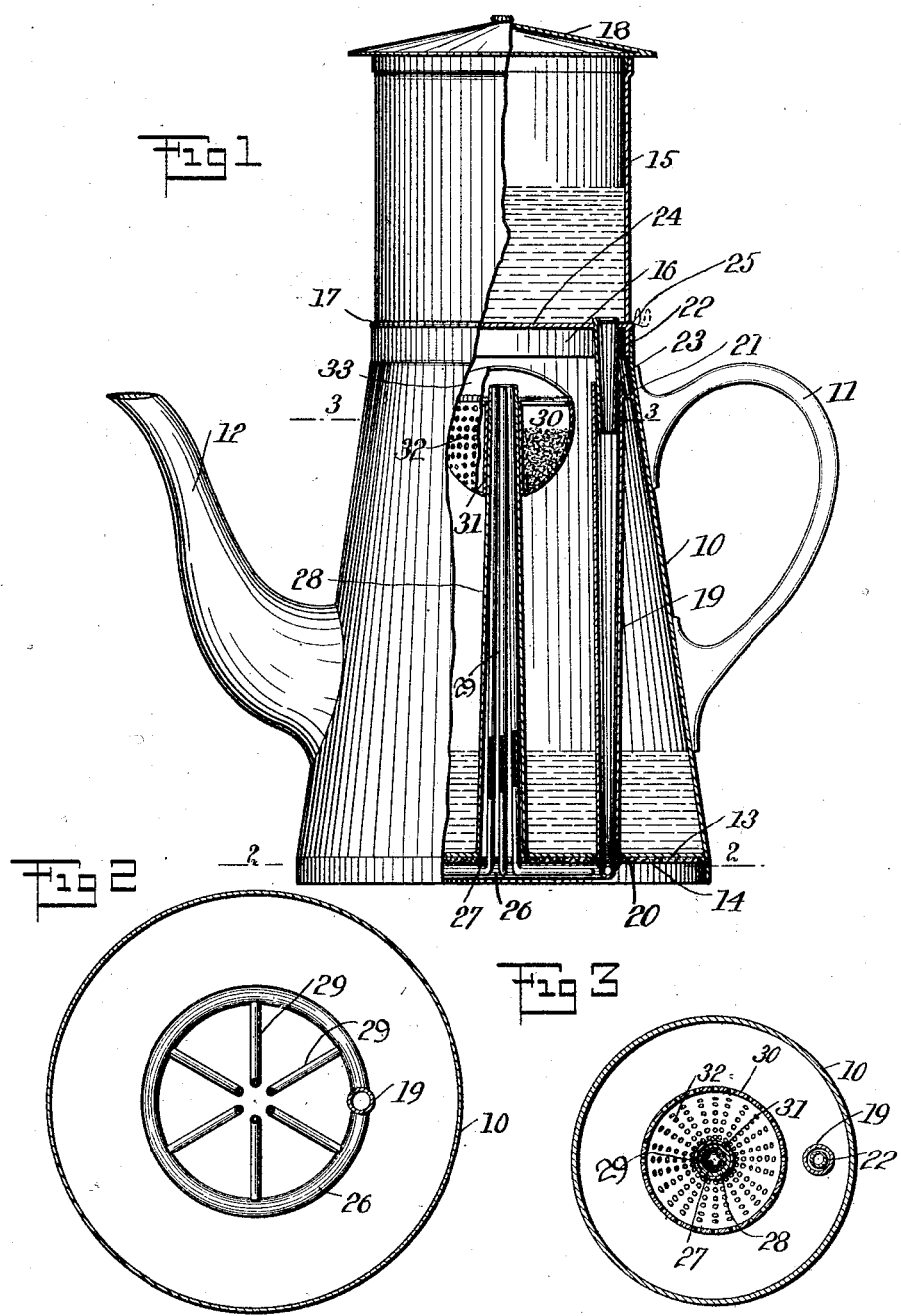
WITNESSES
C. J. Hachenburg
John N. Bradrogel
INVENTORS
Paul Pons,
Charles Archambault,
BY
ATTORNEYS

UNITED STATES PATENT OFFICE.

PAUL PONS AND CHARLES ARCHAMBAULT, OF SYLVAN LAKE, ALBERTA, CANADA.

PERCOLATOR.

1,115,451.          Specification of Letters Patent.        Patented Oct. 27, 1914.

Application filed August 1, 1913. Serial No. 782,447.

*To all whom it may concern:*

Be it known that we, PAUL PONS and CHARLES ARCHAMBAULT, subjects of the King of Great Britain, and both residents of Sylvan Lake, in the Province of Alberta and Dominion of Canada, have invented certain new and useful Improvements in Percolators, of which the following is a full, clear, and exact description.

This invention relates to percolators for making infusions from tea, coffee and other substances, and has reference to a device of this class which comprises a vessel for the infusion, a reservoir to contain water or other liquid to be used in preparing the infusion, a container for the substance from which the infusion is made, and a connection between the reservoir and the container, this connection including a liquid heating element located at the outside of the device for heating the liquid passing from the reservoir to the container, after which it escapes to the vessel.

An object of the invention is to provide a simple, compact and efficient percolator which can be manufactured inexpensively in different forms, sizes and styles, by means of which infusions of varying degrees of strength can be prepared from tea, coffee and other substances, with extreme rapidity, with the employment of a minimum of heat, and which is excellently well adapted for use by hunters, campers, prospectors and the like, as well as in the household.

A further object of the invention is to provide a percolator in which but a small quantity of the liquid is heated at a time, in which any desired quantity of the infusion can be prepared without utilizing all the liquid or all the substance, in which the liquid need not be preheated, in which the infusion itself after being prepared is not again subjected to the action of the heat, and in which the substance is not so acted upon as to cause deleterious constituents thereof to enter the infusion.

The invention consists in the construction and combination of parts to be more fully described hereinafter and particularly set forth in the claims.

Reference is to be had to the accompanying drawings forming a part of this specification, in which similar characters of reference indicate corresponding parts in all the views and in which—

Figure 1 is a partial vertical section of a percolator constituting an embodiment of our invention; Fig. 2 is a transverse section on the line 2—2 of Fig. 1; and Fig. 3 is a similar view on the line 3—3 of Fig. 1.

Before proceeding to a more detailed explanation of our invention it should be understood that the same can be fashioned from sheet metal or any other material adapted for the purpose. While we have for example illustrated a form of the percolator in which the liquid reservoir is separable from the main vessel, we can also embody the invention in a device in which these elements are permanently associated. These as well as others of the details of construction form no part of the invention and can be varied in accordance with individual preference and special conditions, without departing from the underlying spirit of the invention.

Referring more particularly to the drawings, we provide a main vessel 10 shown for example in the conventional form of coffee pot having a handle 11 and a spout 12. The bottom 13, of the main vessel, is preferably located somewhat above the lower edge or rim. Underneath the bottom is a layer 14 of heat-insulating material such as asbestos or the like. A liquid reservoir 15, for example, of cylindrical form, is mounted upon the vessel 10, having the lower rim 16 arranged to fit within the top of the vessel. It is provided with a bead or flange 17 engaging at the upper edge with the vessel 10, and serving to assist in holding the reservoir in position. The latter has a cover or top 18 of suitable form.

Arranged within the vessel 10 and extending vertically from the bottom to near the top thereof is a tube 19, the lower end of which projects through an opening 20 in the bottom of the vessel. The open, upper end of the tube is held in place against the side of the vessel, by means of an arm or bracket 21. The reservoir 15 has a downwardly extending outlet 22 of tapered form and proportioned to project into and fit within the upper end of the tube 19. If so desired, a washer 23 may be introduced between the tube and the outlet to insure a tight joint. The latter as will be seen, extends downwardly from an opening in the bottom 24 of the reservoir. It is provided with an adjustable valve closure 25 by means of which the flow of liquid from the reservoir into the tube 19 can be regulated and controlled. Located under the bottom of the vessel 10 is an annular pipe 26 secured to and communicating with the lower end of the tube 19. The layer 14 of insulating material has a substantially central opening 27 which registers with the lower open end of an upwardly extending tube 28 arranged within the vessel and of tapered form. It is disposed centrally with respect to the vessel and terminates near the top thereof. The pipe 26 encompasses a number of smaller, radial pipes 29, the lower, outwardly disposed ends of which are secured to and communicate internally with the pipe 26. The pipes 29 extend upwardly through the tubes 28, having their upper ends secured in the upper extremity of this tube.

A perforated container 30 for the tea, coffee or other substance is removably arranged upon the upper end of the tube 28, having an internally disposed open ended tubular part 31 proportioned to receive the end of the tube 28 so that the container can be mounted upon the same. The container may be of any suitable form and is preferably of rounded shape, the lower part thereof being provided with a number of perforations 32. An imperforate cover 33 of suitable rounded form fits upon the open top of the container, which is located, as will be seen, closely adjacent to the under side of the liquid reservoir 15. The container may be fashioned from screen or any other suitable reticulate material.

When our percolator is in use the water or other liquid which is to be used in the infusion is placed in the reservoir 15. Tea, coffee or other substance is placed in the container 30, which is mounted upon the upper end of the tube 28. Heat is applied to the radiator by means of an open flame or if so desired the percolator itself can be set directly upon a stove. The valve 25 is opened to allow water to flow through the outlet 22 into the tube 19 and through the radiator where it is at once heated. The water heated in the circular pipe 26, as well as in the horizontal portions of the pipes 29, will rapidly rise in temperature, and due to the small diameters of the pipes 29 the water therein will readily turn to steam, thereby accelerating the outflow of the liquid heated into the circular pipe 26 through the small pipes 29. The hot vapors in the vertical portions of the pipes 29 are prevented from condensation therein by the heat entering the pipe 28 and also by the flow of steam constantly generated by the heater in the horizontal portions of the pipes 29. The hot vapors and steam rising through the pipes 29 escape from the open ends thereof into the container, passing through the substance and dripping from the openings into the vessel, in the form of the infusion. As much of the infusion as desired can be prepared, the amount of liquid flowing into the reservoir being of course regulated by the valve 25.

It will be noted that the liquid in the reservoir remains cool, and thus serves to cool the cover 33 of the container, which acts as a condenser. Steam escaping from the pipes 29 is thus condensed and falls upon the substance in the container, in the form of liquid. In this way, the strength of the infusion is augmented. It will also be noted that the infusion itself is not again subjected directly to the action of heat, being protected by the layer of insulating material 14.

Having thus described our invention, we claim as new and desire to secure by Letters Patent:—

1. A device of the class described comprising an infusion vessel, a reservoir, a tube within said vessel, said reservoir having a valve-controlled outlet discharging into said tube, a heating element at the outside of said vessel and communicating with said tube, a second tube extending upwardly into said vessel, a perforated container for the substance, removably associated with said second tube, and a plurality of pipes communicating with and forming a part of said heating element and extending within said second tube to discharge at said container.

2. A device of the class described comprising an infusion vessel, a tube arranged within said vessel, a reservoir associated with said vessel and having a valve-controlled discharge outlet communicating with said tube, an annular heating member under said vessel at the outside thereof, communicating with said tube, a second tube extending upwardly within said vessel, said vessel having an opening in the bottom thereof registering with said second tube, a plurality of pipes having radially disposed ends communicating with said annular member and extending upwardly into said second tube, and a perforated container for the substance, having an inwardly disposed tubular part by means of which it can be removably mounted upon said second tube.

3. A device of the class described comprising,—an infusion vessel; a reservoir; a tube within said vessel having a valve controlled outlet engaging said tube and adapted to discharge thereinto; a heating element at the outside of and adjacent to the bottom of the vessel, said heating element communicating with said tube and through which the liquid is supplied to said heating elements through said reservoir; an insulating member separating the bottom of the vessel from said heating element; a tube in said vessel extending from the bottom thereof; a perforated container at the opposite end of said second mentioned tube; and a plurality of small tubes positioned in said second tube and forming the outlet from said heating element to the said container.

In witness whereof we have signed our names to this specification in the presence of two subscribing witnesses.

PAUL PONS.
CHARLES ARCHAMBAULT.

Witnesses:
GEO. W. GREENE,
I. NALLY.

Copies of this patent may be obtained for five cents each, by addressing the "Commissioner of Patents, Washington, D. C."